(12) United States Patent
Tajima et al.

(10) Patent No.: US 6,187,420 B1
(45) Date of Patent: Feb. 13, 2001

(54) FENDER

(75) Inventors: Kei Tajima, Amagasaki; Yoshihisa Mizumoto, Akashi, both of (JP)

(73) Assignee: Sumitomo Rubber Industries, Ltd., Hyogo (JP)

( * ) Notice: Under 35 U.S.C. 154(b), the term of this patent shall be extended for 0 days.

(21) Appl. No.: 09/129,188

(22) Filed: Jul. 23, 1998

(30) Foreign Application Priority Data

Jul. 23, 1997 (JP) .................................................... 9-197543

(51) Int. Cl.⁷ .............................. B63B 59/02; B32B 25/08
(52) U.S. Cl. ........................ 428/213; 428/31; 428/517; 428/519; 428/495; 114/219; 114/220
(58) Field of Search ..................................... 428/492, 493, 428/494, 495, 517, 519, 31, 213; 114/219, 220

(56) References Cited

U.S. PATENT DOCUMENTS

| 4,735,982 | 4/1988 | Orndorff, Jr. | 524/269 |
|---|---|---|---|
| 4,756,266 * | 7/1988 | Sakuraoka | 114/219 |
| 4,854,258 | 8/1989 | Hausmann et al. | 114/219 |
| 5,095,840 | 3/1992 | Kramer | 114/219 |
| 5,362,572 * | 11/1994 | Hamada et al. | 428/497 |
| 5,702,827 * | 12/1997 | Itoth et al. | 428/519 |
| 5,791,278 * | 8/1998 | Orndorff, Jr. | 114/219 |
| 5,977,259 * | 11/1999 | Sugimoto et al. | 525/232 |
| 6,012,760 * | 1/2000 | Nozika | 296/146.9 |

FOREIGN PATENT DOCUMENTS

| 0405954A1 | 1/1991 | (EP) . |
|---|---|---|
| 9722758 | 6/1997 | (WO) . |
| 9722759 | 6/1997 | (WO) . |

* cited by examiner

*Primary Examiner*—Paul Thibodeau
*Assistant Examiner*—D Lawrence Tarazano
(74) *Attorney, Agent, or Firm*—Birch, Stewart, Kolasch & Birch LLP

(57) ABSTRACT

The present invention provides a novel fender, which has a sufficient shock absorbing action with respect to a ship and is capable of dispersing a compressive force given at the time when the ship comes alongside at the pier and reducing a friction force at the time given when the ship is moored at the pier. A fender of the present invention comprises a fender body 10, and a surface layer 12 with which at least an impact receiving surface of this fender body 10 is coated, wherein the surface layer 12 is made of a blended polymer of a crystalline polyolefin resin and a diene rubber and the proportion of the crystalline polyolefin resin in the blended polymer exceeds 50% by weight and not more than 85% by weight.

9 Claims, 7 Drawing Sheets

F I G. 2
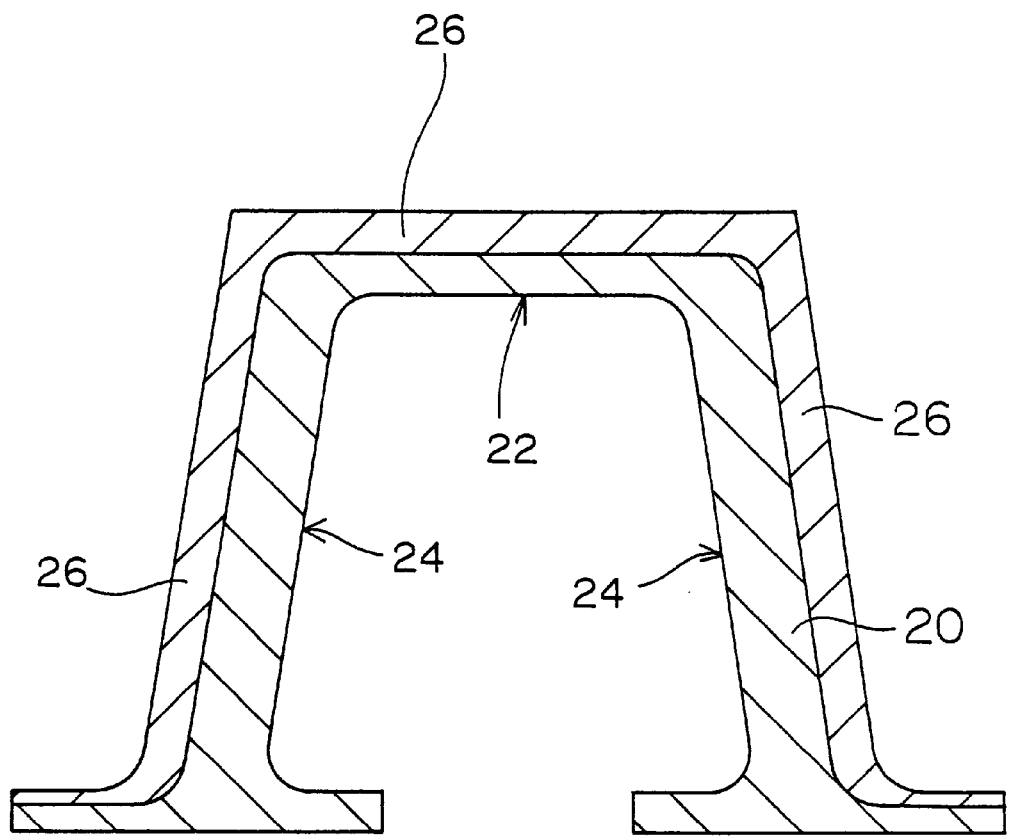

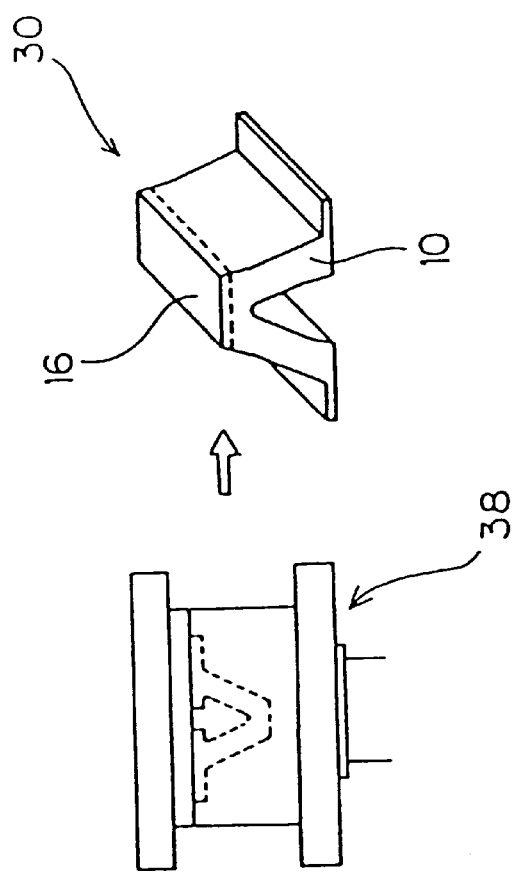
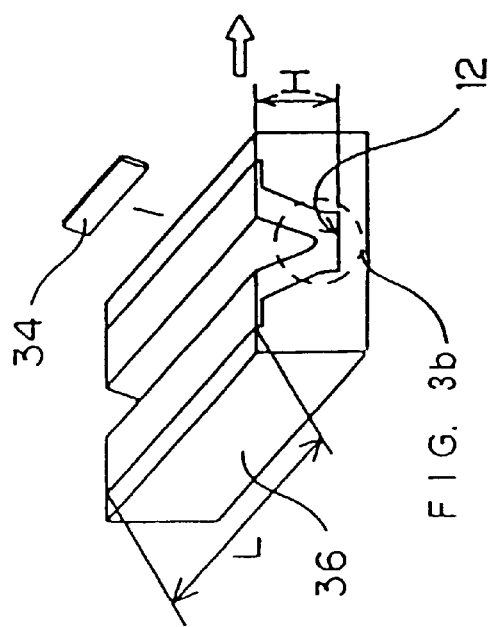
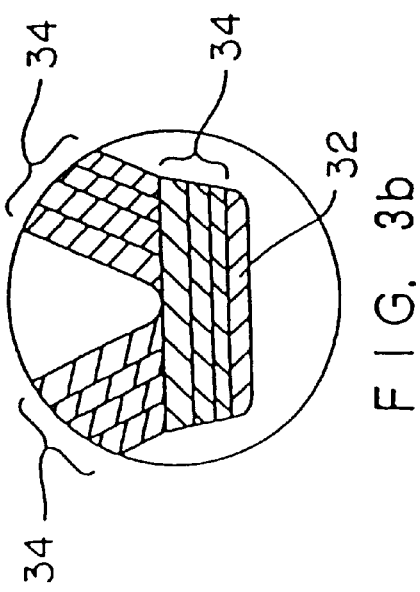
FIG. 3a
FIG. 3b

FENDER

BACKGROUND OF THE INVENTION

The present invention relates to a fender serving as a shock absorber at the time when a ship comes alongside or moored at the pier.

A fender as a shock absorber is disposed at the pier to protect both the ship and pier from an impact or friction produced at the time when the ship comes alongside or moored at the pier of the harbor.

As shown in FIG. 4(*a*), a fender 40 comprises a top section 40 as a contact surface with a ship body, and a leg section 44 attached to both ends of the top section 42, and is fixed to a pier 50 by inserting a bolt 48 into a flange section 46 of the tips of the leg section 44. As shown in 4(*b*), this fender 40 protects the ship body by deforming the leg section 44 to reduce the impact at the time when the ship comes alongside the pier.

As the fender, a fender made of rubber has widely been used, heretofore. However, since a rubber material used in the fender has normally a large friction coefficient $\mu$ of not less than 1, when a ship body 52 comes into contact with the fender 40 diagonally (at the time when the ship comes in contact with the pier diagonally), an excess force is locally exerted and deformation of the fender 40 becomes non-uniform. As a result, not only is the desired shock absorbing performance not exerted, but also the fender 40 itself is liable to cause damage such as crack and the like.

Since the ship body always rolls by an influence of wave and wind while the ship is moored at the pier, a friction force is produced between the fender and ship body. Therefore, as shown in FIG. 6, a shear force is exerted on the fender 40 by friction with the ship body 52 and the fender is liable to be deteriorated, for example, damage such as crack and the like arise.

On the other hand, a fender obtained by forming a coating layer of a material such as polyurethane having a low friction coefficient $\mu$ on the surface of a fender body of rubber alone is known, but the adhesion between the coating layer and fender body is low and the coating layer is liable to be peeled off.

To solve the above problems, there has been suggested a method of dispersing a compressive force given at the time when the ship comes alongside at the pier or reducing a friction force given at the time when the ship is moored at the pier by providing a surface layer 54 of a resin having a small friction coefficient, such as ultra-high molecular weight polyethylene (friction coefficient $\mu$=0.2) on the top section of the fender 56 to make the surface of the fender slippery, as shown in FIG. 7. According to this method, the surface layer 54 is fixed by inserting a bolt 48 into a metal plate 58 embedded in the fender 56.

However, since the friction coefficient of the surface layer 54 is low, a friction force between the bolt 48 or washer 49 and the surface layer 54 is small. When the above-described excess force or shear force is exerted at the time when the ship comes alongside or is moored at the pier, the surface layer 54 is removed from the bolt 48 section, as shown in FIG. 8.

According to the above method, since parts such as is surface layer 54, is metal plate 58 and a bolt are required, additionally, the production cost of the fender becomes higher. On the other hand, even if the surface layer 54 is directly bonded on the surface of the top section of the fender 56 without using the bolt, the bonding force between the surface layer 54 and rubber is low and the fender is considerably deteriorated.

SUMMARY OF THE INVENTION

It is an object of the present invention to provide a novel fender, which has a sufficient shock absorbing action with respect to a ship and is capable of dispersing a compressive force given at the time when the ship comes alongside at the pier and reducing a friction force given at the time when the ship is moored at the pier.

The present inventors have intensively studied to solve the above problems. As a result, the present inventors have found a new fact that, there can be obtained a novel fender, which has a sufficient shock absorbing action with respect to the ship and is capable of dispersing a compressive force given at the time when the ship comes alongside at the pier and reducing a friction force given at the time when the ship is moored at the pier. The fender includes a fender body made of rubber, and a surface layer with which at least an impact receiving surface of said fender body is coated, wherein said surface layer is made of a blended polymer of a crystalline polyolefin resin and a diene rubber and the proportion of the crystalline polyolefin resin in the blended polymer exceeds 50% by weight and not more than 85% by weight.

That is, the present invention provides:

(1) A fender comprising a fender body made of rubber, and a surface layer with which at least an impact receiving surface of said fender body is coated, wherein said surface layer is made of a blended polymer of a crystalline polyolefin resin and a diene rubber and the proportion of the crystalline polyolefin resin in the blended polymer exceeds 50% by weight and not more than 85% by weight;

(2) The fender according to the above item (1), wherein the blended polymer is dynamically cured;

(3) The fender according to the above item (1) or (2), wherein the fender body and surface layer are integrally bonded by cure of the fender body;

(4) The fender according to the above item (1), wherein a friction coefficient of the crystalline polyolefin resin is from 0.2 to 0.3; and (5) The fender according to the above item (1), wherein the proportion of an ethylenically unsaturated bond in the diene rubber is not less than 1.2% by weight.

According to the fender of the present invention, by using a conventional fender made of rubber having an excellent shock absorbing action as a fender body and coating an impact receiving surface of the fender with the above surface layer, a friction coefficient of the surface of the fender can be reduced. As a result, a sufficient shock absorbing action can be exerted and, at the same time, a compressive force given at the time when the ship comes alongside at the pier can be dispersed and a friction force given at the time when the ship is moored at the pier can be reduced.

BRIEF DESCRIPTION OF THE DRAWINGS

FIG. 2 is a sectional view showing another embodiment of a fender of the present invention;

FIG. 3 is an explanation diagram showing one embodiment of a method of producing a fender of the present invention;

Figure 1:
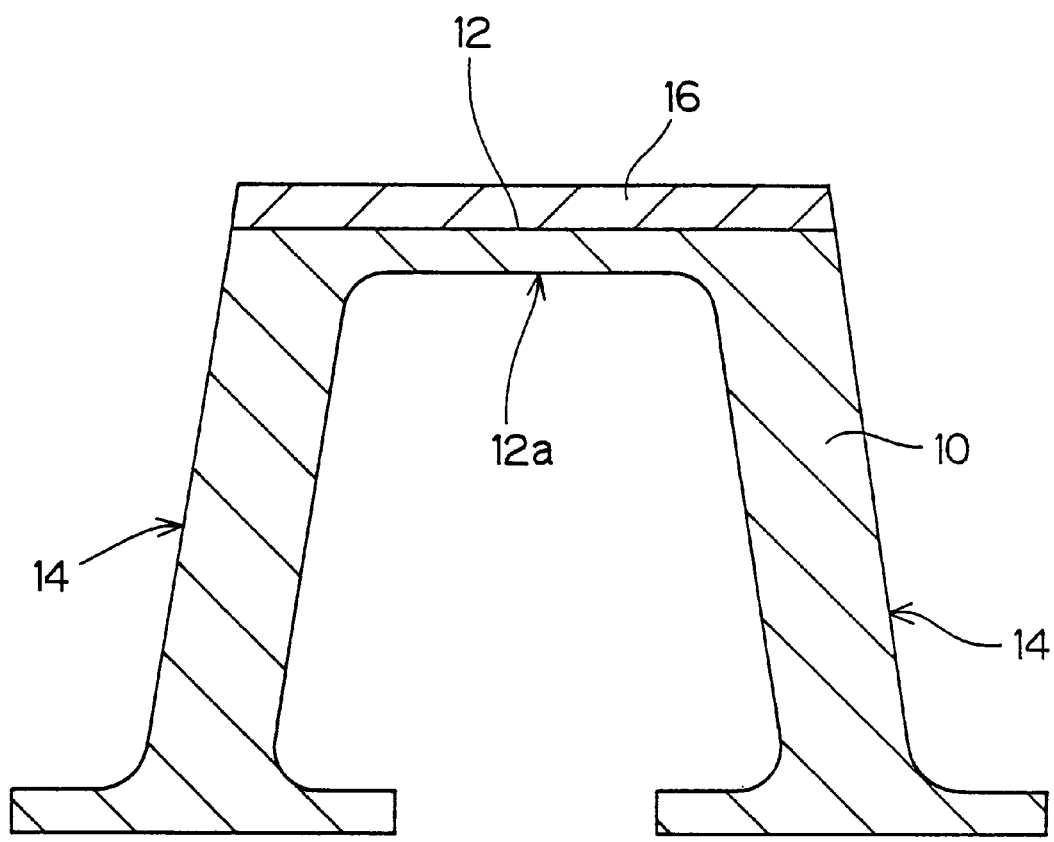
FIG. 1 is a sectional view showing one embodiment of a fender of the present invention.
Figure 4:
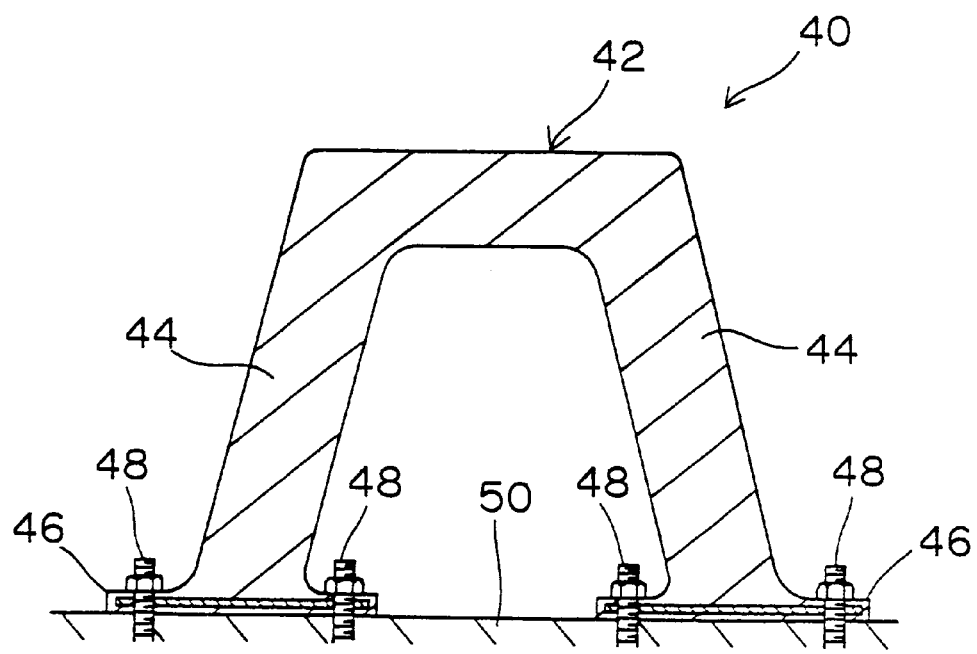
FIG. 4(a) is a sectional view showing one embodiment of a conventional fender.
FIG. 4(b) is a sectional view showing the compressed state of the conventional fender.
Figure 4:
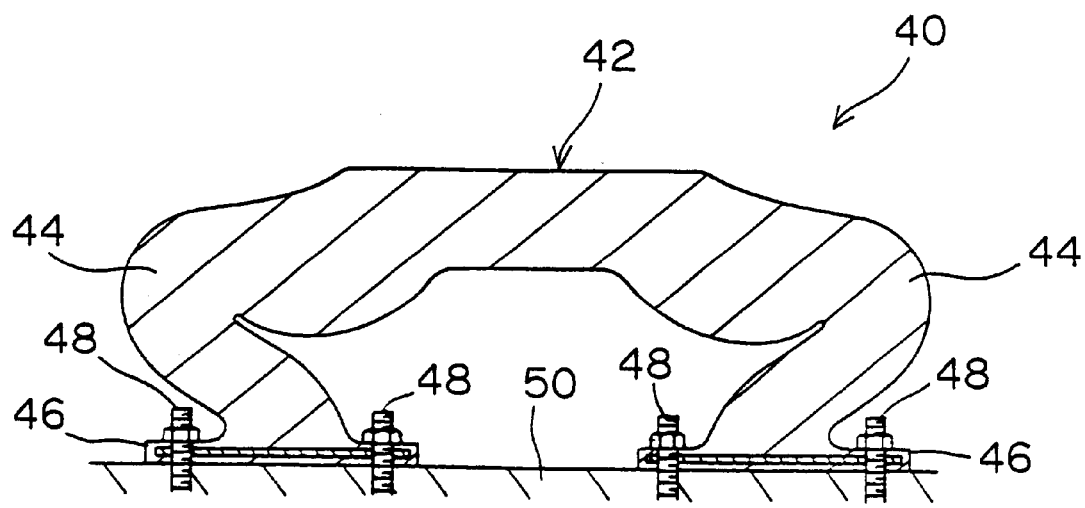
Figure 5:
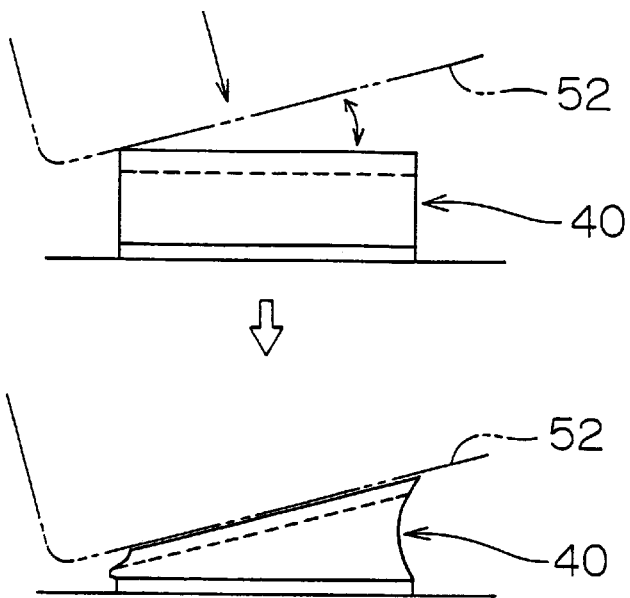
FIG. 5 is a side view showing the state of a fender at the time when the ship comes in contact with the pier diagonally.
Figure 6:
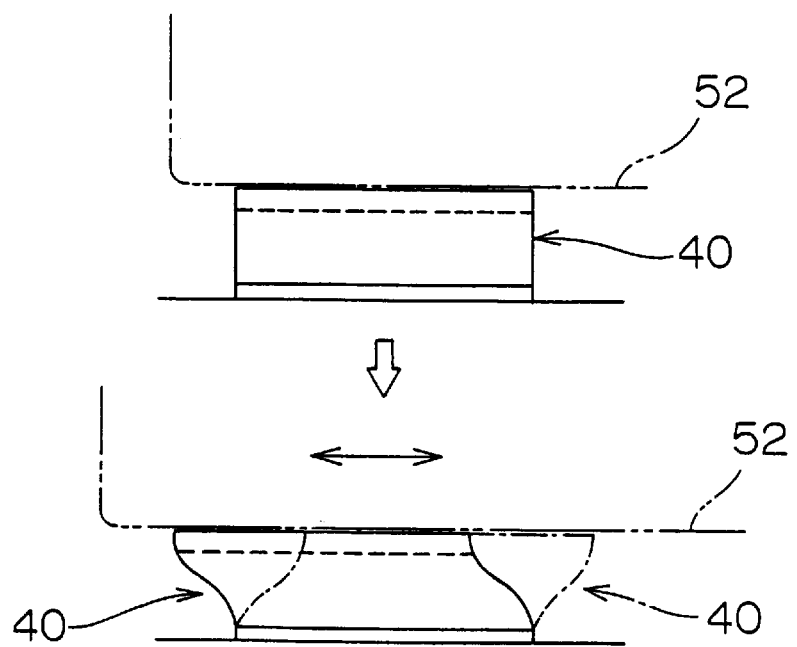
FIG. 6 is a side view showing the state of a fender at the time when the ship is moored at the pier.
Figure 7:
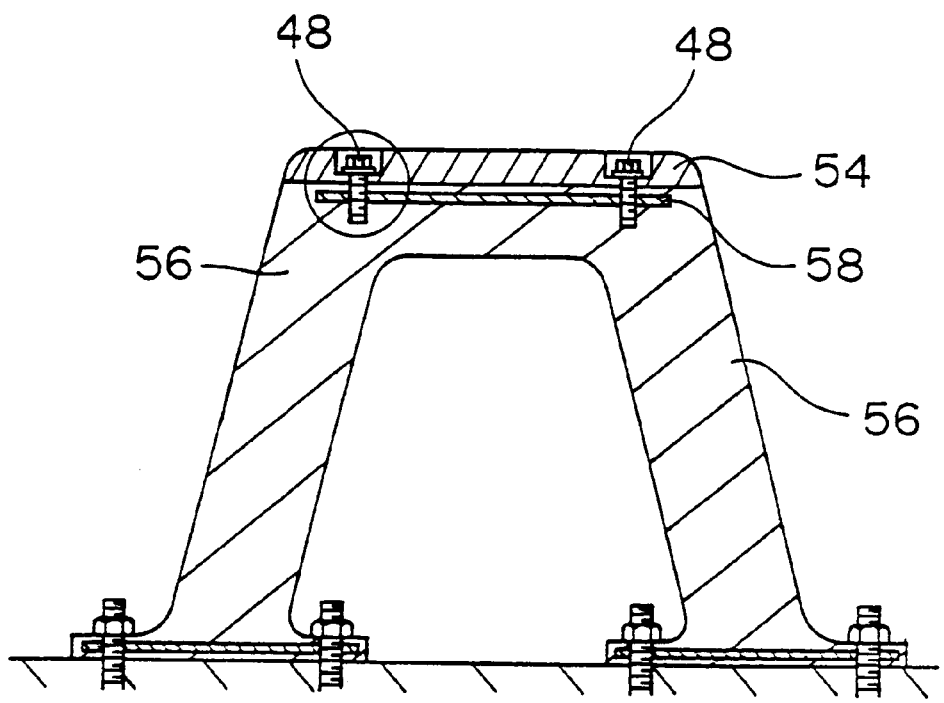
FIG. 7(a) is a sectional view showing a fender provided with a surface layer on the top section.
FIG. 7(b) is a partial enlarged diagram showing a fixing member of the surface layer.
Figure 7:
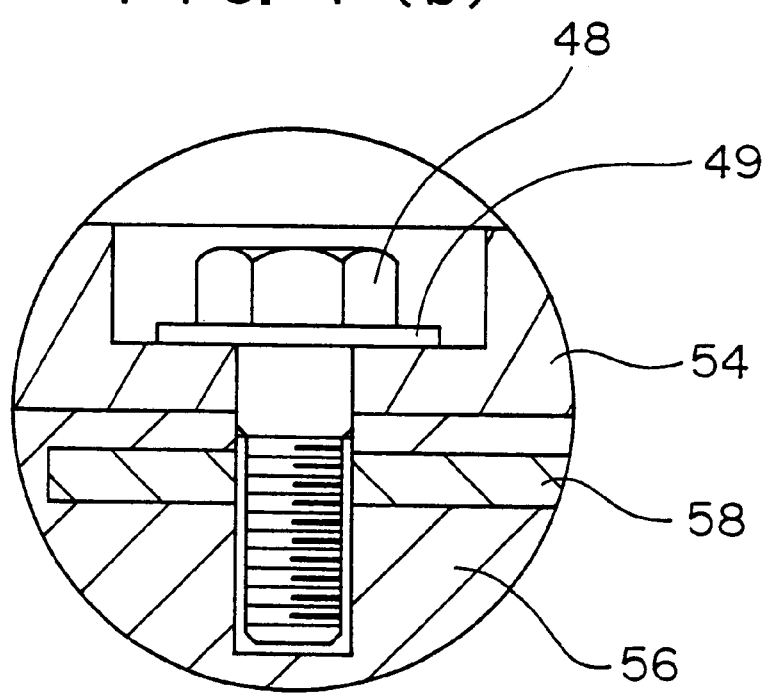
Figure 8:
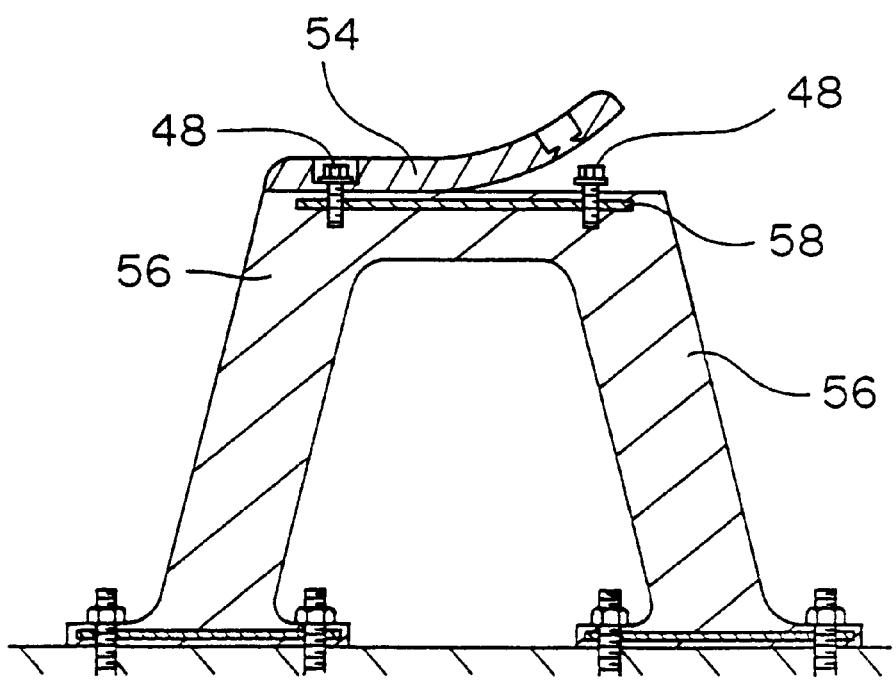
FIG. 8 is an explanation diagram showing the state where the surface layer 56 shown in FIG. 7 is removed from a fender body.

The reference symbols in the figures denote the followings:

10: Fender body
12: Impact receiving surface
16: Surface layer
20: Fender body
26: Surface layer
30: Fender.

DISCLOSURE OF THE INVENTION

In the fender of the present invention, the blended polymer used for making the surface layer is dynamically cured, preferably. When the blended polymer is dynamically cured, not only the blended polymer is highly cured, but also a diene rubber can be dispersed in a crystalline polyolefin resin in the state of fine particles having an average particle diameter of not more than 30 $\mu$m. As a result, a tensile breaking elongation $E_B$ and a tensile breaking strength $T_B$ of the surface layer are improved, thereby contributing to an improvement in a shock absorbing performance of the whole fender.

The surface layer can be firmly bonded to the fender body by integrally bonding in case of cure of the fender body made of rubber.

The fender of the present invention will be described in detail with reference to the drawings.

Referring to FIG. 1 showing one embodiment of the present invention, the fender comprises a fender body 10, wherein a top section 12a, whose surface is an impact receiving surface 12, and a leg section 14 are integrally formed, and a surface layer 16 provided on the impact receiving surface 12.

The fender body 10 is made of various rubber materials, which have hitherto been used in a fender made of rubber, such as natural rubber, styrene-butadiene rubber, butadiene rubber, ethylene-propylene-diene rubber (EPDM) and the like.

The surface layer 16 is made of a blended polymer of a crystalline polyolefin resin having a small friction coefficient as a resin component, and a diene rubber having excellent rubber-like elasticity.

The thickness of the surface layer 16 is not specifically limited, but is preferably not less than 2 mm, particularly not less than 5 mm, in order to sufficiently exert an action of dispersing a compressive force given at the time when the ship comes alongside at the pier and reducing a friction force given at the time when the ship is moored at the pier. On the other hand, when the thickness of the surface layer 16 is too larger than that of the top section 12a of the fender body 10, a harmful influence is liable to be exerted on the shock absorbing performance of the fender. Therefore, the thickness of the surface layer 16 is preferably a thickness of 10% or less of the thickness of the top section 12a.

As the crystalline polyolefin resin used in the present invention, polyethylene is preferred. Examples thereof include resins having a small friction coefficient $\mu$, specifically resins having a friction coefficient $\mu$ of about 0.2 to 0.3, such as ultra-high molecular weight polyethylene (UHMWPE, friction coefficient $\mu$=0.2), low-density polyethylene (LDPE), straight-chain low-density polyethylene (LLDPE), high-density polyethylene (HDPE), polypropylene (PP), ionomer, metallocene catalyst polymerized polyethylene, metallocene catalyst polymerized polypropylene and the like. The above-mentioned crystalline polyolefin resins may be used alone, or a blend of two or more kinds of them may be used.

As the diene rubber used in the present invention, a rubber containing an ethylenically unsaturated bond in the proportion in a polymer, for example, a rubber containing not less than 1.2% by weight of the ethylenically unsaturated bond is preferred. Specific examples thereof include those having a double bond in a main chain of the molecule, such as natural rubber (NR), isoprene rubber (IR), butadiene rubber (BR), styrene-butadiene rubber (SBR), ethylene-propylene-diene rubber (EPDM), acrylonitrile-butadiene rubber (NBR), isobutylene-isoprene rubber (IIR), acrylic rubber (ACM) and the like. The above-mentioned diene rubber may be used alone, or a blend of two or more kinds of them may be used.

A blend ratio of the crystalline rubber to the diene rubber is adjusted so that the proportion of the polyolefin resin exceeds 50% by weight and not more than 85% by weight, and preferably from 60 to 80% by weight, based on the total amount of the blended polymer of the crystalline rubber and diene rubber.

When the proportion of the polyolefin resin is smaller than the above range, the friction coefficient $\mu$ of the surface layer of the fender is increased. As a result, the action of dispersing a compressive force given at the time when the ship comes alongside at the pier and reducing a friction force given at the time when the ship is moored at the pier becomes insufficient. Furthermore, the tensile breaking elongation $E_B$ and tensile breaking strength $T_B$ of the surface layer are lowered so that the shock absorbing performance of the whole fender is lowered and the fender is liable to be deteriorated, unfavorably.

The friction coefficient $\mu$ [Japanese Industrial Standards (JIS) K 7125] of the surface layer is preferably not more than 0.5, and more preferably not more than 0.3. The tensile breaking elongation $E_B$ (JIS K 6760) of the surface layer is preferably not less than 500% and the tensile breaking strength $T_B$ (JIS K 6760) of the surface layer is preferably not less than 250 kgf/cm$^2$.

On the other hand, when the proportion of the polyolefin resin exceeds the above range, the rubber-like elasticity of the surface layer is lost. Therefore, a permanent set PS of the surface layer becomes too large and the surface layer is liable to be deteriorated.

The permanent set PS (JIS K 6301) of the surface layer is preferably not more than 80%, and more preferably not more than 75%.

When the proportion of the polyolefin resin exceeds the above range, the adhesion between the surface layer and fender body is liable to be lowered, unfavorably.

The method of producing the fender of the present invention will be described in detail hereinafter with reference to FIG. 3.

A fender 30 of the present invention is obtained by spreading a sheet 32 for making a surface layer 16 and a rubber sheet 34 for making a fender body 10 in a mold 36, curing them by using a press curing machine 38, cooling and removing the molded article from the mold.

The sheet 32 for surface layer is obtained by masticating a blended polymer of a crystalline polyolefin resin and a diene rubber in a predetermined proportion, blending other additives such as curing agent, cure accelerator and, optionally, carbon black, kneading them and forming into a sheet suited for working.

The sheet 34 for fender body is obtained by masticating rubber materials such as natural rubber, styrene-butadiene rubber, butadiene rubber and the like, blending other additives such as curing agent, cure accelerator and, optionally, carbon black in the composition ratio suited for fender made of rubber, kneading them and forming into a sheet suited for working.

When the sheets are spread in the mold 36, first, the sheet 32 for surface layer is spread over the portion corresponding to the impact receiving surface 12 of the fender body 10 and then the sheet 34 for fender body is spread over the above sheet. In such way, a prototype of the fender 30 is formed in the mold 36. The fender 30 of the present invention can be obtained by press-curing this prototype, cooling and removing the molded article from the mold.

According to the above-mentioned production method, the fender body 10 and surface layer 16 can be integrally molded and the both can be bonded to each other by cure, integrally and firmly.

In the present invention, the sheet for surface layer may be a sheet obtained by dynamically curing the above blended polymer.

The dynamic cure is characterized by blending a curing agent with the above blended polymer, kneading the blended polymer with curing, and applying a shear force to the blended polymer until the cure has been completed. According to such a cure method, not only the blended polymer is highly cured, but also the diene rubber can be dispersed in the crystalline polyolefin resin as the resin component in the state of fine particles having an average particle diameter of not more than 30 μm, and normally from about 1 to 5 μm.

By dynamically curing the blended polymer, both of the thermoplasticity and rubber-like elasticity can be exhibited. As a result, the tensile breaking elongation $E_B$ and tensile breaking strength $T_B$ of the surface layer are improved, thereby improving the shock absorbing performance of the whole fender. Furthermore, since the blended polymer has the thermoplasticity, the blended polymer can also be poured into the mold in the state of being molten with heating.

The above dynamic cure is performed by using a normal kneading device or a mixing extruder, such as Banbury mixer, kneader, Brabender mixer or the like. The temperature range of the dynamic cure is about a melting temperature of the crystalline polyolefin resin or higher, and normally from 150 to 250° C.

Examples of the curing agent, which can be used in the present invention, include sulfurs such as powdered sulfur, precipitated sulfur, insoluble sulfur and the like, and resin curing agents such as alkylphenol-formaldehyde resin, heat-reactive phenol resin, alkyl-phenolformaldehyde resin, brominated alkylphenol-formaldehyde resin and the like.

As the cure accelerator, there can be used various cure accelerators, which have hitherto been known.

Examples of the other additive include fillers and colorants, such as carbon black and the like. Carbon black can be blended with the above blended polymer, however, when a large amount of carbon black is blended, the ship body is liable to be contaminated with carbon black when the ship body comes in contact with the fender. In view of enhancement of the visibility and appearance of the fender, various colorants may be blended in place of carbon black.

The fender of the present invention may be an embodiment shown in FIG. 2, wherein the surface layer 26 is formed not only on the top section 20 of the fender body 20 but also on the whole outer surface, in addition to the embodiment shown in FIG. 1.

In the fender shown in FIG. 2, the material of the blended polymer used in the fender body 20 and surface layer 26 as well as production method are the same as those described above.

The thickness of the surface layer 26 is not specifically limited, but is preferably not less than 2 mm, particularly not less than 5 mm, and is a thickness of 10% or less of the thickness of the top section 22 and both leg sections 24, similar to the surface layer 16.

The shape of the fender of the present invention is not limited to that shown in FIG. 1 and FIG. 2, and the fender can take various shapes, which have hitherto been known, such as cylinder and the like as far as at least a surface layer made of the above blended polymer is provided on the impact receiving surface, as a matter of course.

As described above, since the fender of the present invention has a sufficient shock absorbing action to the ship and is capable of a reducing friction coefficient of the surface of the fender, it is possible to disperse a compressive force given at the time when the ship comes alongside at the pier and to reduce a friction force given at the time when the ship is moored at the pier. Also, it is not necessary to additionally attach an impact receiving plate having a small friction coefficient onto the surface of the fender and the fender can be easily produced.

EXAMPLES

The following Reference Examples, Examples and Comparative Examples further illustrate the present invention in detail.

Reference Example

A rubber sheet for fender body was made by blending 2 parts by weight of a curing agent (powdered sulfur), 5 parts by weight of zinc white, 1 part by weight of stearic acid, 60 parts by weight of carbon black, 20 parts by weight of aromatic oil, 1 part of a cure accelerator (N-cyclohexyl-2-benzothiazoylsulfenamide, CZ) and 2 parts by weight of an antioxidant (N-(1,3-dimethylbutyl)-N'-phenyl-p-phenylenediamine manufactured by Ohuchi Shinko Kagaku Kogyo Co., Ltd. under the trade name of "NOCRAC") with 100 parts by weight of a natural rubber (NR, "RSS No. 3"), kneading them and forming the blend into a sheet.

Examples 1 to 2, Comparative Example 1 to 3

A diene rubber (styrene-butadiene rubber) and a crystalline polyolefin resin (polyethylene) were mixed in the proportion shown in Table 1 and then masticated.

Then, a blended polymer for surface layer was made by blending 2 parts by weight of a curing agent (powdered sulfur), 1 part by weight of a cure accelerator (CZ), 5 parts by weight of zinc white, 1 part by weight of stearic acid and 2 parts by weight of an antioxidant (aforecited) with 100 parts by weight of the blended polymer thus obtained, and forming the blend into a sheet.

The sheet 32 of the blended polymer for surface layer was spread over the portion corresponding to the impact receiving surface of the top section of the fender body in the mold 36, as shown in FIG. 3. The mold 36 was filled with the rubber sheet 34 for fender body obtained in the above Reference Example, and then a prototype (H=100 mm, L=200 mm) of the fender was made and press-cured at 150° C. for 2 hours.

After cooling, the molded article was removed from the mold to obtain a fender wherein a surface layer 16 is provided on the top section 12a of a fender body 10.

In Examples 1 to 2 and Comparative Examples 1 to 3, "ASAPRENE 303" manufactured by Asahi Kasei Co., Ltd. was used as the styrene-butadiene (SBR). As the polyethylene (PE), "SUMIKASEN α GZ701" (straight-chain low-density polyethylene) manufactured by Sumitomo Chemical Co., Ltd. was used.

Example 3 to 8

A diene rubber (SBR, NR or ethylene-propylene-diene rubber) ground into pieces having a diameter of 3 to 5 mm and a crystalline polyolefin resin (PE or polypropylene) were mixed in the proportion shown in Table 1. Then, a blended polymer for surface layer was made by blending 2 parts by weight of a curing agent (powdered sulfur), 1 part by weight of a cure accelerator (aforecited), 5 parts by weight of zinc white, 1 part by weight of stearic acid and 2 parts by weight of an antioxidant (aforecited) with 100 parts by weight of this mixture, introducing the blend in a twin-screw extruder (HTM38, manufactured by Ipec Co.), dynamically curing the blend with kneading at a kneading rate of 200 rpm at 180° C. and forming into a sheet.

According to the same manner as that described in Examples 1 to 2 and Comparative Examples 1 to 3 except for using the sheet of the above blended polymer and the rubber sheet for fender body obtained in the above Reference Example, a fender shown in FIG. 1 was obtained by spreading the sheets in the mold 36, followed by press cure, cooling and removal from the mold.

In Examples 3 to 8, aforecited NR and PE were used. As the ethylene-propylene-diene rubber (EPDM), "ESPRENE 505A" manufactured by Sumitomo Chemical Co., Ltd. was used. As the polypropylene (PP), "MG05BS" manufactured by Japan Polychem Co. was used.

Physical properties of surface layer:
(Friction coefficient)

The respective test pieces were taken from the surface layer of the fenders obtained in the above Examples and Comparative Examples, and the friction coefficient (dynamic friction coefficient) was measured according to the description of JIS K 7125 "Method for Friction Coefficient Test of Plastic Film and Sheet".

In the measurement of the friction coefficient, a nickel-chrome-plated iron plate (80 mm in width×200 mm in length) was used as an opposite material. As a slipping piece, a piece whose contact force $F_P$ was adjusted to 200 g by adding lead particles was used.

(Tensile breaking elongation and tensile breaking strength)

In the above Examples and Comparative Examples, the tensile breaking elongation $E_B$ (%) and tensile breaking strength $T_B$ (kgf/cm$^2$) of the blended polymer used for making the surface layer were measured at a test rate of 50mm/min according to the description of JIS K 6760 "Test Method of Polyethylene"–4.3 "Tensile Test".

(Permanent set)

Permanent set PS (%) of the blended polymer used for making the surface layer was measured according to the description of JIS K 6301 "Method for Physical Test of Vulcanized Rubber"–4. "Permanent Set Test".

(Evaluation of rubber-like elasticity)

The rubber-like elasticity of the surface layer was evaluated according to the following criteria:

○: The surface layer had good rubber-like elasticity and exhibited good shock absorbing performance;

x: The surface layer had insufficient rubber-like elasticity and exerted a harmful influence on a shock absorbing action of the fender.

With respect to the above respective fenders. the physical properties were measured and the rubber-like elasticity was evaluated. The results are shown in Table 1.

TABLE 1

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
| --- | --- | --- | --- | --- | --- | --- | --- | --- | --- | --- | --- |
| Diene rubber | | | | | | | | | | | |
| SBR | 45 | 20 | 45 | 40 | 20 | 20 | — | — | 70 | 5 | — |
| NR | — | — | — | — | — | — | 20 | — | — | — | — |
| EPDM | — | — | — | — | — | — | — | 40 | — | — | — |
| Crystalline polyolefin resin | | | | | | | | | | | |
| PE | 55 | 80 | 55 | 60 | 80 | — | 80 | 60 | 30 | 95 | 100 |
| PP | — | — | — | — | — | 80 | — | — | — | — | — |
| Dynamic cure | without | without | with | with | with | with | with | with | without | without | without |
| Physical properties of surface layer | | | | | | | | | | | |
| Friction coefficient μ | 0.3 | 0.3 | 0.3 | 0.3 | 0.3 | 0.3 | 0.3 | 0.3 | 0.6 | 0.3 | 0.3 |
| Tensile breaking elongation $E_B$(%) | 530 | 510 | 570 | 560 | 550 | 500 | 500 | 550 | 550 | 510 | 500 |
| Tensile breaking strength $T_B$ (kgf/cm2) | 250 | 260 | 290 | 290 | 300 | 370 | 250 | 280 | 220 | 270 | 300 |

TABLE 1-continued

| | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|
| Permanent set PS (%) | 55 | 75 | 40 | 55 | 60 | 60 | 60 | 40 | 30 | 100 | 100 |
| Evaluation of rubber-like elasticity | ◯ | ◯ | ◯ | ◯ | ◯ | ◯ | ◯ | ◯ | ◯ | X | X |

As is apparent from the respective results of Table 1, all surface layers of the fenders obtained in Examples 1 to 8 had a small friction coefficient. Furthermore, the tensile breaking elongation $E_B$, tensile breaking strength $T_B$ and permanent set PS exhibited respectively a value enough to put to practical use.

On the other hand, in Comparative Example 1, the friction coefficient of the surface layer was large and was not enough to put to practical use.

In Comparative Examples 2 and 3, the friction efficient was lowered to the value enough to put to practical use. However, since the proportion of the resin component is large, permanent set PS was large and the rubber elasticity was also lost.

The disclosure of Japanese Patent Application Serial No. 9-197543, filed on Jul. 23, 1997, is incorporated herein by reference.

What is claimed is:

1. A fender comprising a fender body made of rubber and having a top section with an impact receiving surface and at least two leg sections integrally formed with the top section, wherein at least the impact receiving surface of said fender body is coated with a surface layer, wherein said surface layer is made of a blended polymer of a crystalline polyolefin resin and a diene rubber and the proportion of the crystalline polyolefin resin in the blended polymer exceeds 50% by weight and not more than 85% by weight, and wherein the thickness of said layer is not less than 2 mm and is 10% or less of the thickness of the top section and the leg sections.

2. The fender according to claim 1, wherein the blended polymer is dynamically cured.

3. The fender according to claim 1 or 2, wherein the fender body and surface layer are integrally bonded by cure of the fender body.

4. The fender according to claim 1, wherein a friction coefficient of the crystalline polyolefin resin is from 0.2 to 0.3.

5. The fender according to claim 1, wherein the proportion of an ethylenically unsaturated bond in the diene rubber is not less than 1.2% by weight.

6. The fender according to claim 2, wherein the diene rubber is dispersed in the crystalline polyolefin resin as a resin component in a state of fine particles having an average particle diameter of not more than 30 μm.

7. The fender according to claim 1, wherein the proportion of the crystalline polyolefin resin in the blended polymer is 60 to 80% by weight.

8. The fender according to claim 6, wherein the proportion of the crystalline polyolefin resin in the blended polymer is 60 to 80% by weight.

9. The fender according to claim 6, wherein the fine particles have an average particle diameter of about 1 to 5 μm.

* * * * *